United States Patent
Yamada et al.

(10) Patent No.: US 10,696,871 B2
(45) Date of Patent: Jun. 30, 2020

(54) PRESSURE-SENSITIVE ADHESIVE TRANSFER TAPE AND TRANSFERRING IMPLEMENT

(71) Applicant: Tombow Pencil Co., Ltd., Tokyo (JP)

(72) Inventors: Noboru Yamada, Tokyo (JP); Tatsumi Uchida, Tokyo (JP); Toshitake Murakami, Tokyo (JP); Takuma Takagawa, Tokyo (JP); Shuhei Sasaki, Tokyo (JP)

(73) Assignee: Tombow Pencil Co., Ltd., Tokyo (JP)

( * ) Notice: Subject to any disclaimer, the term of this patent is extended or adjusted under 35 U.S.C. 154(b) by 0 days.

(21) Appl. No.: 15/997,645

(22) Filed: Jun. 4, 2018

(65) Prior Publication Data
US 2018/0282587 A1    Oct. 4, 2018

Related U.S. Application Data

(63) Continuation of application No. 14/908,926, filed as application No. PCT/JP2014/069904 on Jul. 29, 2014, now abandoned.

(30) Foreign Application Priority Data

Aug. 1, 2013  (JP) ................................. 2013-160107

(51) Int. Cl.
*C09J 7/38* (2018.01)
*C09J 7/10* (2018.01)
*C09J 7/21* (2018.01)
*C09J 7/22* (2018.01)
*C09J 7/40* (2018.01)
*C09J 193/04* (2006.01)
*C09J 133/06* (2006.01)
*B32B 7/12* (2006.01)

(52) U.S. Cl.
CPC  *C09J 7/38* (2018.01); *B32B 7/12* (2013.01); *C09J 7/10* (2018.01); *C09J 7/21* (2018.01); *C09J 7/22* (2018.01); *C09J 7/401* (2018.01); *C09J 133/06* (2013.01); *C09J 193/04* (2013.01); *C09J 2201/122* (2013.01); *C09J 2201/606* (2013.01); *C09J 2425/005* (2013.01); *C09J 2433/00* (2013.01); *C09J 2433/005* (2013.01); *C09J 2461/005* (2013.01); *C09J 2491/005* (2013.01); *C09J 2493/005* (2013.01)

(58) Field of Classification Search
None
See application file for complete search history.

(56) References Cited

U.S. PATENT DOCUMENTS

| | | | |
|---|---|---|---|
| 5,234,734 A | 8/1993 | Hamada | |
| 7,070,051 B2 | 7/2006 | Kanner et al. | |
| 2006/0251888 A1 | 11/2006 | Lane et al. | |
| 2006/0251889 A1 | 11/2006 | Lane et al. | |
| 2006/0251890 A1 | 11/2006 | Lane et al. | |
| 2006/0263596 A1 | 11/2006 | Bamborough et al. | |
| 2007/0218276 A1 | 9/2007 | Hiramatsu et al. | |
| 2007/0231571 A1 | 10/2007 | Lane et al. | |
| 2010/0139707 A1 | 6/2010 | Boonstra et al. | |
| 2014/0023858 A1 | 1/2014 | Igarashi et al. | |

FOREIGN PATENT DOCUMENTS

| | | |
|---|---|---|
| JP | H04-144798 A | 5/1992 |
| JP | 2001-240812 A | 9/2001 |
| JP | 2003-096415 A | 4/2003 |
| JP | 2005-350607 A | 12/2005 |
| JP | 2011-057883 A | 3/2011 |
| JP | 2012-149200 A | 8/2012 |

OTHER PUBLICATIONS

Jis K 5601-2-2, "Testing methods for paint components—Part 2: Components analysis in solvent soluble matter—Section 2: Softening point (Ring and ball method)", journal, published Apr. 20, 1999, Japanese Standards Association, Tokyo, Japan.

The Japanese Patent Office, International Search Report of the International Search Authority in PCT/JP2014/069904 dated Oct. 14, 2014, which is the an international application of Applicant Tombow Pencil Co., Ltd. that shares the same priority as this application.

U.S. Patent and Trademark Office, Office action in U.S. Appl. No. 14/908,926 dated Dec. 1, 2017, which is another application of Applicant Tombow Pencil Co., Ltd. that shares the same priority as this application.

*Primary Examiner* — Frank D Ducheneaux
(74) *Attorney, Agent, or Firm* — Kolitch Romano LLP

(57) ABSTRACT

A pressure-sensitive adhesive transfer tape that may have on one surface of a release substrate made of paper or a plastic film, a pressure-sensitive transfer layer having an adhesion inhibiting layer and an adhesive layer, wherein the adhesion inhibiting layer and the adhesive layer are successively stacked on one another. The adhesion inhibiting layer may prevent the adhesive layer formed on one adherend from being in contact with another adherend to weaken the adhesion between the one and another adherends, enabling the one and another adherends to be easily separated from each other. With the passage of time after being put on one another, the adhesion inhibiting layer may migrate to another adherend, so that the adherend is in contact with the adhesive layer, exhibiting strong adhesion properties between the adherends.

17 Claims, No Drawings

PRESSURE-SENSITIVE ADHESIVE TRANSFER TAPE AND TRANSFERRING IMPLEMENT

CROSS-REFERENCE TO RELATED APPLICATIONS

This application is a continuation of U.S. patent application Ser. No. 14/908,926, filed Jan. 26, 2016, which is a national phase application of PCT/JP2014/069904, filed Jul. 29, 2014, which claims priority to Japanese Patent Application No. 2013-160107, filed Aug. 1, 2013, each of which is hereby incorporated by reference.

TECHNICAL FIELD

The present invention relates to a pressure-sensitive adhesive transfer tape which is pressed against a paper surface or the like using a hand-held transferring implement so that the adhesive layer is transferred to an adherend, such as a paper surface, making it possible to bond the adherends, and a transferring implement having the same.

BACKGROUND ART

As one of adhesive double-coated tapes, there is an unsupported adhesive double-coated tape which has no support (core material) and transfers only an adhesive layer to an adherend, and this tape has been used as a pressure-sensitive adhesive transfer tape in various fields and applications. A structure of this tape is generally such that an adhesive layer is formed on one surface of a release substrate and the resultant material is wound into a roll form. Recently, as a paper bonding implement mainly for office use, a transferring implement having a pressure-sensitive adhesive transfer tape wound into a small roll and fitted to a transfer device, which is named "Tape glue" or the like, has been on the market.

This transferring implement is characterized by having, in an implement body which can be used by holding it with a single hand, a delivery reel round which the pressure-sensitive adhesive transfer tape is wound, a transfer head which transfers the adhesive layer to a transfer object while peeling off from the substrate the adhesive layer on the pressure-sensitive adhesive transfer tape fed from the delivery reel, and a take-up reel which takes up the substrate remaining after used in transfer. This implement has advantages, for example, in that, differing from a liquid adhesive and a solid adhesive conventionally generally used for bonding of paper, the adhesive can be easily transferred to an adherend without staining hands, that a drying time until bonding is completed is not required, and that paper as an adherend is not creased.

However, in the bonding operations, a situation is present that sealing is mistakenly done, the position of bonding is incorrect, or the like and thus the adherends must be separated from each other and re-bonded together. Many of the pressure-sensitive adhesive transfer tapes exhibit strong adhesion properties immediately after the adherends are put on one another, and therefore the adherends cannot be easily separated from each other, and, when an attempt is made to forcibly separate the adherends, the adherends may suffer breakage. On the other hand, there is a product using an adhesive layer having low adhesion properties. However, such a product is aimed at, so to speak, "temporarily bonding" adherends, and cannot be used in applications, such as sealing of an envelope, that are required to ensure security.

For solving the problems, PTL 1 has reported an adhesive tape that enables the adherend once put on the tape to be peeled off. In this adhesive tape, an adhesive surface is formed from an adhesive composition containing, relative to 100 parts by weight of an adhesive component, 50 to 90 parts by weight of a filler, and the center-line surface roughness of the adhesive surface is controlled to be 5 to 50 µm so that the bond area to an adherend is reduced, suppressing the adhesion of the tape to the adherends immediately after the adherends are put on one another. In addition, by using the adhesive component having a glass transition temperature of lower than room temperature, the adhesion after a lapse of 24 hours from the time when the adherends are put together is improved. However, this adhesive tape is suitable for the use in which a member and another member are arranged mainly inside of an electrical or electronic device, but has a problem in that, when applied to an adherend having a rough surface, such as paper, the bond area is not satisfactorily reduced, making it difficult to remove the adherend from the tape even immediately after the adherends are put together.

CITATION LIST

Patent Literature

PTL 1: JP-A-2012-149200

SUMMARY OF INVENTION

Technical Problem

In view of the above-mentioned problems, a task of the present invention is to provide a more useful pressure-sensitive adhesive transfer tape and a transferring implement which have, so to speak, two contradictory properties that the tape can be applied to an adherend, such as paper, and, immediately after adherends are put on one another, the adherends can be easily separated from each other and re-bonded together, and that, after a predetermined period of time has lapsed from the time when the adherends are put on one another, the adherends are strongly bonded to each other.

Solution to Problem

The present inventors have conducted extensive and intensive studies. As a result, it has been found that the above-mentioned problems can be solved by forming an adhesion inhibiting layer between a release substrate and an adhesive layer, and the present invention has been completed.

Specifically, the invention is as follows.

1) A pressure-sensitive adhesive transfer tape having, on one surface of a release substrate made of paper or a plastic film, a pressure-sensitive transfer layer having an adhesion inhibiting layer and an adhesive layer, wherein the adhesion inhibiting layer and the adhesive layer are successively stacked on one another, the pressure-sensitive adhesive transfer tape being characterized in that the adhesion inhibiting layer prevents an adhesive layer formed on one adherend from being in contact with another adherend to weaken the adhesion between the adherends, enabling the adherends to be easily separated from each other, and, with the passage of time after being put on one another, the adhesion inhibiting layer migrates into another adherend, so that the adherend is in contact with the adhesive layer, exhibiting strong adhesion properties between the adherends.

2) The pressure-sensitive adhesive transfer tape according to item 1) above, wherein the adhesion inhibiting layer is formed from one type or two or more types of resins selected from a terpene resin, a rosin derivative, a petroleum resin, a coumarone-indene resin, a hydrogenated aromatic copolymer, a styrene resin, a phenolic resin, an acrylic resin, a xylene resin, and a hydrogenation product thereof.

3) The pressure-sensitive adhesive transfer tape according to item 1) or 2) above, wherein the adhesion inhibiting layer is formed from a resin having a softening point of 100° C. or lower.

4) The pressure-sensitive adhesive transfer tape according to any one of items 1) to 3) above, wherein the adhesion inhibiting layer has a thickness of 0.05 to 5 μm, and the adhesive layer has a thickness of 5 to 50 μm.

5) The pressure-sensitive adhesive transfer tape according to any one of items 1) to 4) above, wherein the adhesive layer is formed from an acrylic adhesive.

6) The pressure-sensitive adhesive transfer tape according to item 5) above, wherein the acrylic adhesive is an acrylic adhesive containing, relative to 100 parts by weight of an acrylic copolymer, 0.1 to 10 parts by weight of a crosslinking agent.

7) The pressure-sensitive adhesive transfer tape according to any one of items 1) to 6) above, wherein the adhesion inhibiting layer is formed on one surface of the release substrate, and then the adhesive layer is formed on the adhesion inhibiting layer.

8) The pressure-sensitive adhesive transfer tape according to any one of items 1) to 6) above, wherein the adhesion inhibiting layer and the adhesive layer are formed by phase separation on one surface of the release substrate.

9) The pressure-sensitive adhesive transfer tape according to item 8) above, which is formed by applying a mixture obtained by mixing a compound forming the adhesion inhibiting layer with the adhesive in a ratio of 10 to 50 parts by weight of the compound, relative to 100 parts by weight (in terms of a solids content) of the adhesive.

10) A transferring implement having the pressure-sensitive adhesive transfer tape according to any one of items 1) to 9) above.

Advantageous Effects of Invention

The pressure-sensitive adhesive transfer tape of the invention is advantageous not only in that, immediately after adherends are put on one another, the adhesion of the tape is low and hence correction operations, such as separating the adherends from each other and re-bonding the separated adherends, are easy, but also in that, after a predetermined period of time has lapsed from the time when the adherends are put on one another, the adherends are strongly bonded to each other, and therefore the pressure-sensitive adhesive transfer tape can be used without any problem in applications, such as sealing of an envelope, that are required to ensure security.

DESCRIPTION OF EMBODIMENTS

Hereinbelow, the present invention will be described in detail.

The pressure-sensitive adhesive transfer tape of the invention has an adhesion inhibiting layer formed between a release substrate and an adhesive layer, and has, on one surface of a release substrate made of paper or a plastic film, a pressure-sensitive transfer layer which is formed by successively stacking the adhesion inhibiting layer and adhesive layer on one another.

The above-mentioned release substrate is obtained by applying a release agent to both surfaces of a substrate to form release layers. Examples of release agents include a fluororesin, a silicone resin, and a fluorosilicone resin.

As a substrate used in the release substrate, paper or a plastic film having elastic modulus in flexure suitable for a transferring implement having an automatic winding mechanism is used. As paper, there can be mentioned glassine paper and the like. Examples of plastic films include a polyester film, such as polyethylene terephthalate, and a polyolefin film, such as polypropylene or polyethylene. The thickness of the substrate is preferably 3 to 50 μm from the viewpoint of the transfer properties and the cost.

When the pressure-sensitive transfer tape of the invention is transferred to one adherend to be bonded, an adhesive layer is formed on the adherend and an adhesion inhibiting layer is formed on the adhesive layer. Immediately after being put on one another, the adhesion inhibiting layer prevents the transferred adhesive layer from being in contact with another adherend to weaken the adhesion between the adherends, enabling the adherends to be easily separated from each other. With the passage of time after being put on one another, the adhesion inhibiting layer migrates into another adherend, so that the adherend is in contact with the adhesive layer, exhibiting strong adhesion properties between the adherends.

The adhesion inhibiting layer preferably has a thickness in the range of from 0.05 to 5 μm. When the thickness of the adhesion inhibiting layer is smaller than 0.05 μm, it is likely that the adhesion properties do not become satisfactorily low immediately after the adherends are put together, making it difficult to separate the adherends from each other. On the other hand, when the thickness of the adhesion inhibiting layer is larger than 5 μm, a period of time required until strong adhesion properties are exhibited is likely to be markedly increased, causing the practical performance to be poor. The adhesion inhibiting layer may be formed in the form of a continuous film, or may be discontinuously patterned to such an extent that the effects of the invention are not sacrificed. The thickness and film form of the adhesion inhibiting layer may be appropriately selected depending on the use of the pressure-sensitive adhesive transfer tape, the type of the adherend, the adhesive, or the like.

With respect to a compound forming the adhesion inhibiting layer (hereinafter, referred to as "adhesion inhibitor"), there is no particular limitation and any adhesion inhibitor can be used as long as, immediately after being put on one another, the adhesion inhibitor can prevent the transferred adhesive layer from being in contact with another adherend to weaken the adhesion between the adherends, enabling the adherends to be easily separated from each other, and, with the passage of time after being put on one another, the adhesion inhibitor can migrate into another adherend. The adhesion inhibitor migrates into another adherend, so that the adherend is in contact with the adhesive layer, exhibiting strong adhesion properties between the adherends.

Specific examples of the adhesion inhibitors include terpene resins, such as a terpene phenol resin, a terpene resin, and a liquid terpene resin (e.g., SYLVARES resin, manufactured by Arizona Chemical Company, LLC., and YS POLYESTER resin, manufactured by Yasuhara Chemical Co., Ltd.), rosin derivatives (e.g., SUPER ESTER and PENSEL rosin derivatives, manufactured by Arakawa Chemical Industries, Ltd.), petroleum resins (e.g., ARKON resin, manufactured by Arakawa Chemical Industries, Ltd., and MARV resin, manufactured by Idemitsu Kosan Co., Ltd.), coumarone-indene resins (e.g., NITTORESIN COUMARONE resin, manufactured by Nitto Chemical Co., Ltd.), hydrogenated aromatic copolymers (e.g., CLEARON copolymers, manufactured by Yasuhara Chemical Co., Ltd.), styrene resins (e.g., YS Resin, manufactured by Yasuhara Chemical Co., Ltd.), phenolic resins (e.g., LIGNOL resin, manufactured by Lignyte Inc.), acrylic resins (e.g., ARUFON resin, manufactured by Toagosei Co., Ltd., and DIANAL resin, manufactured by Mitsubishi Rayon Co., Ltd.), xylene resins (e.g., NIKANOL resin, manufactured by Fudow Co., Ltd.), resins, such as hydrogenation products of the above resins, and surfactants. The adhesion inhibitor is not limited to these resins as long as it has the above-mentioned properties. Of these, preferred are terpene resins, rosin derivatives, coumarone-indene resins, and styrene resins. These resins do not exhibit adhesion properties by themselves, but flow under such a pressure as applied by pressing using a hand and are easily formed into a relatively uniform film even in a small amount. The adhesion inhibitors may be used individually or in combination.

It is preferred that the adhesion inhibiting layer is formed from a resin having a softening point of 100° C. or lower, and, as the resin forming the adhesion inhibiting layer, one which is in a solid form or in a liquid state at room temperature can be used. The softening point of the resin forming the adhesion inhibiting layer is more preferably from 30 to 100° C., especially preferably from 50 to 100° C. The softening point of the resin can be determined by the ring and ball method described in JIS K 5601-2-2.

The adhesion inhibiting layer formed from a resin having a softening point of higher than 100° C. has a high stiffness such that the resin is unlikely to migrate into the adherend by a general pressing operation, and therefore it is likely that desired adhesion properties are not exhibited after a time lapse from the time when the adherends are put together. When the adhesion inhibiting layer is in the abovementioned temperature range, the resin easily migrates into the adherend or the like by a general pressing operation, and therefore, immediately after the adherends are put on one another, the adhesion between the adherends is kept low to facilitate the correction operations, and the adherends can be strongly bonded together with the passage of time. Further, in the case of the adhesion inhibiting layer formed from a resin having a softening point of higher than room temperature, it is possible to prevent the resin from migrating into the adhesive layer with the passage of time to reduce the adhesion inhibiting layer, and it is possible to prevent the resin from flowing out of the pressure-sensitive adhesive transfer tape when exposed to high temperatures.

The adhesion inhibiting layer may contain, in addition to the above-mentioned compound, an additive, such as a filler, a wetting agent, a viscosity modifier, a lubricant, or a solvent, in such an amount that the effects of the invention are not sacrificed.

As an adhesive forming the above-mentioned adhesive layer, an acrylic adhesive, a rubber adhesive, a silicone adhesive, a rosin adhesive, an urethane adhesive, a polyether adhesive, a polyester adhesive, or the like can be used. From the viewpoint of achieving excellent application properties, an acrylic adhesive is especially preferred.

As an acrylic adhesive, one containing as a main component an acrylic copolymer obtained by copolymerizing an acrylate monomer with a copolymerizable monomer appropriately incorporated is preferably used.

As an acrylate monomer, for example, an alkyl acrylate, such as methyl acrylate, ethyl acrylate, butyl acrylate, 2-ethylhexyl acrylate, octyl acrylate, cyclohexyl acrylate, or benzyl acrylate, or an alkyl methacrylate, such as butyl methacrylate, 2-ethylhexyl methacrylate, cyclohexyl methacrylate, or benzyl methacrylate, is used, and these acrylate monomers are used individually or in combination.

As a copolymerizable monomer to be copolymerized with the acrylate monomer, a monomer having a functional group is preferably used. Examples include carboxyl group-containing monomers, such as acrylic acid, methacrylic acid, crotonic acid, maleic acid, fumaric acid, and itaconic acid; hydroxyl group-containing monomers, such as 2-hydroxyethyl (meth)acrylate, 2-hydroxypropyl (meth)acrylate, 2-hydroxybutyl (meth)acrylate, N-methylolacrylamide, and allyl alcohol; tertiary amino group-containing monomers, such as dimethylaminopropyl (meth)acrylate; N-substituted amido group-containing monomers, such as acrylamide, N-methyl (meth)acrylamide, N-methoxymethyl(meth)acrylamide, and N-octylacrylamide; and epoxy group-containing monomers, such as glycidyl methacrylate. A monomer having no functional group can be appropriately copolymerized with the acrylate monomer, and examples of monomers having no functional group include vinyl acetate, vinyl propionate, vinyl ether, styrene, and acrylonitrile.

Examples of commercially available products of the above-mentioned acrylic copolymers include NISSETSU copolymers, manufactured by Nippon Carbide Industries Co., Inc.; ORIBAIN copolymers, manufactured by TOYOCHEM Co., Ltd.; ARONTACK copolymers, manufactured by Toagosei Co., Ltd.; SAIBINOL copolymers, manufactured by Saiden Chemical Industry Co., Ltd.; SK-DYNE copolymers, manufactured by Soken Chemical & Engineering Co., Ltd.; ACRYSET copolymers, manufactured by Nippon Shokubai Co., Ltd.; BINSOL copolymers, manufactured by Ipposha Oil Industries Co., Ltd.; and VINYLOL copolymers, manufactured by Showa Denko K.K.

By crosslinking the above acrylic copolymer, the resultant copolymer can be preferably used as the acrylic adhesive in the invention.

As a crosslinking agent, according to the type of the functional group of the copolymerized monomer having a functional group, an isocyanate, epoxy, metal chelate compound, amine compound, melamine, hydrazine compound, aldehyde compound, metal alkoxide, or metal salt crosslinking agent or the like is used. Of these, an isocyanate crosslinking agent is preferably used.

As examples of isocyanate crosslinking agents, there can be mentioned hexamethylene diisocyante, phenylene diisocyante, tolylene diisocyante, xylylene diisocyante, and naphthalene diisocyante.

The crosslinking agent may coexist with the acrylic copolymer being produced, namely, may be present upon copolymerizing an acrylate monomer with a monomer having a functional group, or may be added and reacted after the acrylic copolymer is obtained. From the viewpoint of easily controlling the property of the resultant adhesive, the crosslinking agent is preferably added after the acrylic copolymer is obtained.

Further, in the invention, by using a monomer having in the molecule thereof two or more radically polymerizable double bonds and copolymerizing the monomer with an acrylate monomer, the acrylic copolymer can be crosslinked.

In this case, a monomer having a functional group is not indispensable to crosslinking, and therefore may be appropriately used for controlling the property of the resultant adhesive.

Examples of monomers having in the molecule thereof two or more radically polymerizable double bonds include 1,2-ethylene glycol diacrylate, 1,3-propylene glycol diacrylate, 1,4-butanediol diacrylate, 1,6-hexanediol diacrylate, trimethylolpropane triacrylate, 1,2-ethylene glycol dimethacrylate, 1,3-propylene glycol dimethacrylate, 1,4-butanediol dimethacrylate, 1,6-hexanediol dimethacrylate, trimethylolpropane trimethacrylate, and methylenebisacrylamide.

With respect to the adhesive forming the adhesive layer in the invention, one containing, relative to 100 parts by weight of an adhesive main component (an acrylic copolymer in the case of an acrylic adhesive), 0.1 to 10 parts by weight, more preferably 1 to 5 parts by weight of a crosslinking agent is preferably used. When the amount of the crosslinking agent is less than 0.1 part by weight, the adhesive has poor holding power such that the adherends are unlikely to be bonded together strongly even after a predetermined period of time has lapsed from the time when the adherends are put on one another. On the other hand, when the amount of the crosslinking agent is more than 10 parts by weight, the adhesive layer becomes too stiff and hence the adhesive force is reduced, so that interfacial peeling between the adherend and the adhesive layer is likely to occur. The amount of the crosslinking agent contained can be appropriately changed according to the type of the adhesive main component, the type of the adherend, or the like.

Further, the adhesive layer can contain an additive, such as a tackifier, a filler, a wetting agent, a viscosity modifier, a lubricant, or a solvent. With respect to the additive and the amount thereof, there is no particular limitation as long as the effects of the invention are not sacrificed.

For surely obtaining satisfactory adhesion properties after a time lapse from the time when the adherends are put together, the adhesive layer preferably has a thickness in the range of from 5 to 50 μm, more preferably in the range of from 5 to 40 μm. The adhesive layer may be formed in the form of a continuous film, or may be discontinuously patterned.

With respect to the method for forming the adhesion inhibiting layer and adhesive layer on the release substrate, there is no particular limitation, but, for example, there can be mentioned the following methods.

Specifically, there can be mentioned a method in accordance with a "double-layer coating method". In this method, a mixture of an adhesion inhibitor forming the adhesion inhibiting layer and a solvent is applied onto a release substrate and dried to form an adhesion inhibiting layer, and then an adhesive solution is applied onto the adhesion inhibiting layer and dried to form an adhesive layer, so that a stacked structure can be formed on the release substrate. As the adhesive solution, one which is obtained by adding a crosslinking agent and a solvent to an adhesive main component and controlled to have an appropriate viscosity is used.

Alternatively, there can be mentioned a method in accordance with a "phase separation method". In this method, an adhesion inhibitor (for example, a resin) forming the adhesion inhibiting layer is mixed into an adhesive solution in an amount ratio larger than the threshold limit of the compatibility with the adhesive, and then the resultant mixture is applied onto a release substrate and dried to cause the resin forming the adhesion inhibiting layer to undergo phase separation from the adhesive layer, so that a stacked structure can be formed on the release substrate. In this case, the ratio of the adhesive and resin mixed varies depending on the types of the adhesive and resin and hence is not limited, but, when the adhesive and the resin are mixed in a ratio of 10 to 50 parts by weight of the resin, relative to 100 parts by weight (in terms of a solids content) of the adhesive, the formation of an adhesion inhibiting layer from the phase-separated resin is facilitated.

Examples of solvents for the above-mentioned solution include ketones, such as methyl ethyl ketone, acetone, methyl isobutyl ketone, and cyclohexanone; esters, such as ethyl acetate and butyl acetate; hydrocarbons, such as toluene, xylene, and n-hexane; alcohols, such as ethanol, isopropanol, and n-butanol; and water. These solvents may be used appropriately in combination.

As a coating apparatus, a bar coater, a roll coater, a gravure coater, a knife coater, a die coater, a comma coater, a lip coater, a kiss-reverse coater, or the like can be appropriately used.

A transfer implement can be obtained by slitting the pressure-sensitive adhesive transfer tape of the invention into a tape with a width of 8 to 9 mm, and winding the tape round a core and fitting the resultant tape in a roll form to a transferring implement having an automatic winding mechanism. As an example of the transferring implement having an automatic winding mechanism, there can be mentioned one having a delivery reel round which the pressure-sensitive adhesive transfer tape is wound, a transfer head which transfers the adhesive layer to a transfer object while peeling off from the substrate the adhesive layer on the pressure-sensitive adhesive transfer tape fed from the delivery reel, and a take-up reel which takes up the substrate after the transfer, but the transferring implement is not limited to this.

EXAMPLES

Hereinbelow, the present invention will be described in more detail with reference to the following Examples, which should not be construed as limiting the scope of the invention.

(Measurement of a Thickness of the Coating Layer)

A cross-section of the produced pressure-sensitive adhesive transfer tape was examined using a scanning electron microscope JSM-6060LV, manufactured by JEOL Ltd., and a thickness of the coating layer was measured by an image analysis method.

[Preparation of a Pressure-Sensitive Adhesive Transfer Tape by a Double-Layer Coating Method]

Example 1

<Production of a Coating Composition for Adhesion Inhibiting Layer>

5 Parts by weight of a specialty rosin ester (SUPER ESTER A75 rosin ester, manufactured by Arakawa Chemical Industries, Ltd.; softening point: 75° C.) was dissolved in 100 parts by weight of a mixed solvent of toluene and n-butanol (mixing ratio=1:1) to obtain a coating composition for adhesion inhibiting layer.

<Production of a Coating Composition for Adhesive Layer>

100 Parts by weight of an adhesive A formed from an acrylic copolymer (ORIBAIN BPS1109 copolymer, manufactured by TOYOCHEM Co., Ltd.; solids content: 40%), 2 parts by weight of an isocyanate crosslinking agent (CORONATE L agent, manufactured by Nippon Polyurethane Industry Co., Ltd.), and 30 parts by weight of toluene were mixed with one another to obtain a coating composition for adhesive layer.

<Production of a Pressure-Sensitive Adhesive Transfer Tape>

The coating composition for adhesion inhibiting layer was applied using a gravure coater onto a release substrate (material: polyethylene terephthalate film; thickness: 12 μm) which had been subjected to double-side releasing treatment, and then dried to form an adhesion inhibiting layer having a thickness of 0.5 μm. The coating composition for adhesive layer was applied using a die coater onto the formed adhesion inhibiting layer, and then dried to form an adhesive layer having a thickness of 30 μm, obtaining a pressure-sensitive adhesive transfer tape.

Example 2

An adhesion inhibiting layer having a thickness of 0.5 μm and an adhesive layer having a thickness of 30 μm were formed on a release substrate in substantially the same manner as in Example 1 except that the amount of the isocyanate crosslinking agent in the coating composition for adhesive layer was changed to 0.5 part by weight, obtaining a pressure-sensitive adhesive transfer tape.

Example 3

An adhesion inhibiting layer having a thickness of 0.5 μm and an adhesive layer having a thickness of 30 μm were formed on a release substrate in substantially the same manner as in Example 1 except that the amount of the isocyanate crosslinking agent in the coating composition for adhesive layer was changed to 3 parts by weight, obtaining a pressure-sensitive adhesive transfer tape.

Example 4

An adhesion inhibiting layer having a thickness of 0.1 μm and an adhesive layer having a thickness of 30 μm were formed on a release substrate in substantially the same manner as in Example 1 except that the amount of the specialty rosin ester in the coating composition for adhesion inhibiting layer was changed to 1 part by weight, obtaining a pressure-sensitive adhesive transfer tape.

Example 5

An adhesion inhibiting layer having a thickness of 1.0 μm and an adhesive layer having a thickness of 30 μm were formed on a release substrate in substantially the same manner as in Example 1 except that the amount of the specialty rosin ester in the coating composition for adhesion inhibiting layer was changed to 10 parts by weight, obtaining a pressure-sensitive adhesive transfer tape.

Example 6

An adhesion inhibiting layer having a thickness of 0.5 μm and an adhesive layer having a thickness of 30 μm were formed on a release substrate in substantially the same manner as in Example 1 except that, instead of the specialty rosin ester in the coating composition for adhesion inhibiting layer, 5 parts by weight of a terpene phenol resin (SYLVARES TP95 resin, manufactured by Arizona Chemical Company, LLC.; softening point: 95° C.) was used, obtaining a pressure-sensitive adhesive transfer tape.

Example 7

An adhesion inhibiting layer having a thickness of 0.5 μm and an adhesive layer having a thickness of 30 μm were formed on a release substrate in substantially the same manner as in Example 1 except that, instead of the specialty rosin ester in the coating composition for adhesion inhibiting layer, 5 parts by weight of a coumarone-indene-styrene copolymer (NITTORESIN COUMARONE G-90 copolymer, manufactured by Nitto Chemical Co., Ltd.; softening point: 90° C.) was used, obtaining a pressure-sensitive adhesive transfer tape.

Example 8

An adhesion inhibiting layer having a thickness of 0.5 μm and an adhesive layer having a thickness of 30 μm were formed on a release substrate in substantially the same manner as in Example 1 except that the adhesive A formed from an acrylic copolymer in the coating composition for adhesive layer was changed to an adhesive B (BINSOL AS-2050 adhesive, manufactured by Ipposha Oil Industries Co., Ltd.; solids content: 45%), obtaining a pressure-sensitive adhesive transfer tape.

Example 9

An adhesion inhibiting layer having a thickness of 0.5 μm and an adhesive layer having a thickness of 30 μm were formed on a release substrate in substantially the same manner as in Example 1 except that the adhesive A formed from an acrylic copolymer in the coating composition for adhesive layer was changed to an adhesive C (ARONTACK S-1511X adhesive, manufactured by Toagosei Co., Ltd.; solids content: 40%), obtaining a pressure-sensitive adhesive transfer tape.

Comparative Example 1

An adhesive layer having a thickness of 30 μm was formed on a release substrate in substantially the same manner as in Example 1 except that the coating composition for adhesion inhibiting layer was not applied, obtaining a pressure-sensitive adhesive transfer tape.

[Preparation of a Pressure-Sensitive Adhesive Transfer Tape by a Phase Separation Method]

Example 10

<Production of a Coating Composition>

100 Parts by weight of an adhesive A formed from an acrylic copolymer (ORIBAIN BPS1109 copolymer, manufactured by TOYOCHEM Co., Ltd.), 10 parts by weight of a terpene phenol resin (SYLVARES TP95 resin, manufactured by Arizona Chemical Company, LLC.; softening point: 95° C.), 2 parts by weight of an isocyanate crosslinking agent (CORONATE L agent, manufactured by Nippon Polyurethane Industry Co., Ltd.), and 30 parts by weight of toluene were mixed with one another to obtain a coating composition.

<Production of a Pressure-Sensitive Adhesive Transfer Tape>

The coating composition was applied using a die coater onto a release substrate (material: polyethylene terephthalate film; thickness: 12 µm) which had been subjected to releasing treatment, and then dried to obtain a pressure-sensitive adhesive transfer tape.

A cross-section of the obtained pressure-sensitive adhesive transfer tape was examined using a scanning electron microscope. As a result, two layers on the release substrate were observed, and it was found that the thicknesses of the respective layers were 0.3 µm and 30 µm in the order from the release substrate side.

A sample taken out from each layer was analyzed by FT-IR. As a result, it was found that the layer having a thickness of 0.3 µm was mainly a terpene phenol resin, and the layer having a thickness of 30 µm was a mixture of a terpene phenol resin and the adhesive. The layer mainly made of a terpene phenol resin was taken as an adhesion inhibiting layer, and a layer other than the adhesion inhibiting layer was taken as an adhesive layer.

Example 11

A pressure-sensitive adhesive transfer tape was obtained in substantially the same manner as in Example 10 except that, instead of the terpene phenol resin in the coating composition, 5 parts by weight of a polyterpene resin (SYLVARES TRA25 resin, manufactured by Arizona Chemical Company, LLC.; softening point: 25° C.) was used.

An analysis was similarly made and, as a result, it was found that an adhesion inhibiting layer having a thickness of 0.8 µm was formed on the release substrate, and an adhesive layer having a thickness of 30 µm was formed on the adhesion inhibiting layer.

Example 12

A pressure-sensitive adhesive transfer tape was obtained in substantially the same manner as in Example 10 except that, instead of the terpene phenol resin in the coating composition, 5 parts by weight of a liquid terpene resin (YS RESIN LP resin, manufactured by Yasuhara Chemical Co., Ltd.) was used.

An analysis was similarly made and, as a result, it was found that an adhesion inhibiting layer having a thickness of 1.0 µm was formed on the release substrate, and an adhesive layer having a thickness of 30 µm was formed on the adhesion inhibiting layer.

Example 13

A pressure-sensitive adhesive transfer tape was obtained in substantially the same manner as in Example 10 except that, instead of the terpene phenol resin in the coating composition, 10 parts by weight of a specialty rosin ester (SUPER ESTER A75 rosin ester, manufactured by Arakawa Chemical Industries, Ltd.; softening point: 75° C.) was used.

An analysis was similarly made and, as a result, it was found that an adhesion inhibiting layer having a thickness of 1.0 µm was formed on the release substrate, and an adhesive layer having a thickness of 30 µm was formed on the adhesion inhibiting layer.

Example 14

A pressure-sensitive adhesive transfer tape was obtained in substantially the same manner as in Example 10 except that the adhesive A formed from an acrylic copolymer in the coating composition was changed to an adhesive D (BINSOL R1500S adhesive, manufactured by Ipposha Oil Industries Co., Ltd.; solids content: 44%), and that the amount of the terpene phenol resin was changed to 20 parts by weight.

An analysis was similarly made and, as a result, it was found that an adhesion inhibiting layer having a thickness of 2.0 µm was formed on the release substrate, and an adhesive layer having a thickness of 30 µm was formed on the adhesion inhibiting layer.

Example 15

A pressure-sensitive adhesive transfer tape was obtained in substantially the same manner as in Example 10 except that the adhesive A formed from an acrylic copolymer in the coating composition was changed to an adhesive D (BINSOL R1500S adhesive, manufactured by Ipposha Oil Industries Co., Ltd.), and that, instead of the terpene phenol resin, 20 parts by weight of a specialty rosin ester (SUPER ESTER A75 rosin ester, manufactured by Arakawa Chemical Industries, Ltd.; softening point: 75° C.) was used.

An analysis was similarly made and, as a result, it was found that an adhesion inhibiting layer having a thickness of 1.5 µm was formed on the release substrate, and an adhesive layer having a thickness of 30 µm was formed on the adhesion inhibiting layer.

Example 16

A pressure-sensitive adhesive transfer tape was obtained in substantially the same manner as in Example 10 except that the adhesive A formed from an acrylic copolymer in the coating composition was changed to an adhesive C (ARONTACK S-1511X adhesive, manufactured by Toagosei Co., Ltd.), and that the amount of the terpene phenol resin was changed to 15 parts by weight.

An analysis was similarly made and, as a result, it was found that an adhesion inhibiting layer having a thickness of 0.7 µm was formed on the release substrate, and an adhesive layer having a thickness of 30 µm was formed on the adhesion inhibiting layer.

Example 17

A pressure-sensitive adhesive transfer tape was obtained in substantially the same manner as in Example 10 except that the adhesive A formed from an acrylic copolymer in the coating composition was changed to an adhesive C (ARONTACK S-1511X adhesive, manufactured by Toagosei Co., Ltd.), and that, instead of the terpene phenol resin, 20 parts by weight of a coumarone-indene-styrene copolymer (NITTORESIN COUMARONE G-90 copolymer, manufactured by Nitto Chemical Co., Ltd.; softening point: 90° C.) was used.

An analysis was similarly made and, as a result, it was found that an adhesion inhibiting layer having a thickness of 0.7 µm was formed on the release substrate, and an adhesive layer having a thickness of 30 µm was formed on the adhesion inhibiting layer.

Comparative Example 2

An adhesive layer having a thickness of 30 µm was formed on a release substrate in substantially the same manner as in Example 10 except that the amount of the terpene phenol resin in the coating composition was changed to 3 parts by weight, obtaining a pressure-sensitive adhesive transfer tape.

The obtained pressure-sensitive adhesive transfer tape was slit into a tape with a width of 8.4 mm to obtain a pressure-sensitive adhesive transfer tape in a roll form. The obtained tape was fitted to a transferring implement having an automatic winding mechanism and used as a sample for evaluation.

(Evaluation of Adhesion Properties)

The sample in each of the Examples and Comparative Examples was transferred to a commercially available envelope (trade name: ASKUL Kraft Envelope), and then the envelope was sealed and pressed by moving a 1 kg roller on the envelope forward and backward in one cycle. The resultant envelope was opened after a lapse of each of the periods of time shown in Tables 1 and 2 to evaluate the state of the adhesive layer and paper piece.

Evaluation was made by classifying the results into any of the following: "interfacial peeling": peeling occurs at the interface between the adhesive layer and the paper piece; "cohesive peeling": peeling occurs in a state that the adhesive adheres to both the surface to which the adhesive is transferred and the surface to be bonded; and "paper failure": peeling occurs so that the surface layer portion of the paper piece adheres to the surface of the adhesive layer.

The results of evaluation in the Examples and Comparative Examples are shown in Tables 1 and 2.

TABLE 1

Results of evaluation of pressure-sensitive adhesive transfer tape prepared by "double-layer coating method"

| | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Type of adhesion inhibitor | | Specialty rosin ester | Specialty rosin ester | Specialty rosin ester | Specialty rosin ester | Specialty rosin ester | Terpene phenol resin | Coumarone-indene-styrene copolymer | Specialty rosin ester | Specialty rosin ester | None |
| Amount of adhesion inhibitor (Parts by weight) | | 5 | 5 | 5 | 1 | 10 | 5 | 5 | 5 | 5 | — |
| Type of acrylic adhesive | | A | A | A | A | A | A | A | B | C | A |
| Amount of crosslinking agent (Parts by weight) relative to 100 parts by weight of adhesive | | 2 | 0.5 | 3 | 2 | 2 | 2 | 2 | 2 | 2 | 2 |
| Layer thickness (μm) | Adhesion inhibiting layer | 0.5 | 0.5 | 0.5 | 0.1 | 1 | 0.5 | 0.5 | 0.5 | 0.5 | 0 |
| | Adhesive layer | 30 | 30 | 30 | 30 | 30 | 30 | 30 | 30 | 30 | 30 |
| Evaluation results | Immediately after sealing | Interfacial peeling | Interfacial peeling | Interfacial peeling | Interfacial peeling | Interfacial peeling | Interfacial peeling | Interfacial peeling | Interfacial peeling | Interfacial peeling | Paper failure |
| | 1 min after sealing | Interfacial peeling | Cohesive peeling | Interfacial peeling | Cohesive peeling | Interfacial peeling | Interfacial peeling | Interfacial peeling | Interfacial peeling | Interfacial peeling | Paper failure |
| | 10 min after sealing | Interfacial peeling | Paper failure | Interfacial peeling | Paper failure | Interfacial peeling | Interfacial peeling | Interfacial peeling | Cohesive peeling | Interfacial peeling | Paper failure |
| | 60 min after sealing | Cohesive peeling | Paper failure | Interfacial peeling | Paper failure | Interfacial peeling | Interfacial peeling | Cohesive peeling | Paper failure | Cohesive peeling | Paper failure |
| | 6 hr after sealing | Paper failure | Paper failure | Cohesive peeling | Paper failure | Cohesive peeling | Cohesive peeling | Paper failure | Paper failure | Paper failure | Paper failure |
| | 24 hr after sealing | Paper failure | Paper failure | Paper failure | Paper failure | Paper failure | Paper failure | Paper failure | Paper failure | Paper failure | Paper failure |

TABLE 2

Results of evaluation of pressure-sensitive adhesive transfer tape prepared by "phase separation method"

| | | Example 10 | Example 11 | Example 12 | Example 13 | Example 14 | Example 15 | Example 16 | Example 17 | Comparative Example 2 |
|---|---|---|---|---|---|---|---|---|---|---|
| Type of adhesion inhibitor | | Terpene phenol resin | Polyterpene resin | Liquid terpene resin | Specialty rosin ester | Terpene phenol resin | Specialty rosin ester | Terpene phenol resin | Coumarone-indene-styrene copolymer | Terpene phenol resin |
| Amount of adhesion inhibitor (Parts by weight) | | 10 | 5 | 5 | 10 | 20 | 20 | 15 | 20 | 3 |
| Amount of isocyanate crosslinking agent (Parts by weight) | | 2 | 2 | 2 | 2 | 2 | 2 | 2 | 2 | 2 |
| Amount of acrylic adhesive (Parts by weight) | | 100 | 100 | 100 | 100 | 100 | 100 | 100 | 100 | 100 |
| Type of acrylic adhesive | | A | A | A | A | D | D | C | C | A |
| Layer thickness (μm) | Adhesion inhibiting layer | 0.3 | 0.8 | 1 | 1 | 2 | 1.5 | 0.7 | 0.7 | 0 |
| | Adhesive layer | 30 | 30 | 30 | 30 | 30 | 30 | 30 | 30 | 30 |
| Evaluation results | Immediately after sealing | Interfacial peeling | Interfacial peeling | Interfacial peeling | Interfacial peeling | Interfacial peeling | Interfacial peeling | Interfacial peeling | Interfacial peeling | Paper failure |
| | 1 min after sealing | Interfacial peeling | Interfacial peeling | Cohesive peeling | Interfacial peeling | Interfacial peeling | Interfacial peeling | Interfacial peeling | Interfacial peeling | Paper failure |

TABLE 2-continued

Results of evaluation of pressure-sensitive adhesive transfer tape prepared by "phase separation method"

|  | Example 10 | Example 11 | Example 12 | Example 13 | Example 14 | Example 15 | Example 16 | Example 17 | Comparative Example 2 |
|---|---|---|---|---|---|---|---|---|---|
| 10 min after sealing | Cohesive peeling | Cohesive peeling | Paper failure | Interfacial peeling | Interfacial peeling | Interfacial peeling | Cohesive peeling | Interfacial peeling | Paper failure |
| 60 min after sealing | Paper failure | Paper failure | Paper failure | Cohesive peeling | Interfacial peeling | Cohesive peeling | Paper failure | Cohesive peeling | Paper failure |
| 6 hr after sealing | Paper failure | Paper failure | Paper failure | Paper failure | Cohesive peeling | Paper failure | Paper failure | Paper failure | Paper failure |
| 24 hr after sealing | Paper failure | Paper failure | Paper failure | Paper failure | Paper failure | Paper failure | Paper failure | Paper failure | Paper failure |

As apparent from Tables 1 and 2, it has been confirmed that, by virtue of having the adhesion inhibiting layer formed on the adhesive layer, the obtained pressure-sensitive adhesive transfer tape is advantageous in that the adherends can be easily separated from each other immediately after the adherends are put on one another, and, after a predetermined period of time (10 minutes to 6 hours) has lapsed from the time when the adherends are put together, the adherends are strongly bonded to each other.

Further, from Table 1, it has been confirmed that, by forming the adhesion inhibiting layer having an increased thickness, it is possible to extend the period of time during which the adherends can be separated, and that, by using the resin having an increased softening point as a resin constituting the adhesion inhibiting layer, it is also possible to extend the period of time during which the adherends can be separated. By increasing the amount of the crosslinking agent incorporated into the acrylic copolymer, the period of time during which the adherends can be separated was able to be extended without changing the thickness of the adhesion inhibiting layer. Almost no influence of the type of the acrylic adhesive was found.

Further, as apparent from Table 2, by applying a coating composition containing the adhesion inhibitor and the adhesive onto a release substrate in accordance with a phase separation method, the adhesion inhibiting layer having a predetermined thickness can be formed, and the evaluation results of the adhesion properties almost equivalent to those in the case where the adhesion inhibiting layer is formed by a double-layer coating method were obtained. Furthermore, the adhesive and the adhesion inhibitor had compatibility, and therefore the adhesion inhibitor was contained in the adhesive, but, as shown in Table 2, the almost equivalent evaluation results of the adhesion properties were obtained. Accordingly, the results have confirmed that there can be obtained a pressure-sensitive adhesive transfer tape advantageous in that the adherends are extremely strongly bonded to each other after a predetermined period of time has lapsed.

INDUSTRIAL APPLICABILITY

The pressure-sensitive adhesive transfer tape of the present invention is advantageously used in the application in which a pressure-sensitive transfer layer separated from a substrate is transferred to the surface of an adherend, such as paper, a film, a foam, or a metal, and the adherend is bonded to another adherend, and the adherend is especially preferably paper.

Provided are a more useful pressure-sensitive adhesive transfer tape and a transferring implement, which are advantageous not only in that, immediately after adherends, such as paper, are put on one another, the adherends can be easily separated from each other and re-bonded together, but also in that, after a predetermined period of time has lapsed from the time when the adherends are put on one another, the adherends are strongly bonded to each other. A pressure-sensitive adhesive transfer tape having, on one surface of a release substrate having release layers formed on both surfaces of a paper or plastic film substrate, a pressure-sensitive transfer layer having an adhesion inhibiting layer made of a terpene or rosin resin or the like and an adhesive layer, wherein the adhesion inhibiting layer and the adhesive layer are successively stacked on one another, and a transferring implement having the same.

The present disclosure may include one or more of the following concepts:

A. A pressure-sensitive adhesive transfer tape having, on one surface of a release substrate made of paper or a plastic film, a pressure-sensitive transfer layer having an adhesion inhibiting layer and an adhesive layer, wherein the adhesion inhibiting layer and the adhesive layer are successively stacked on one another, the pressure-sensitive adhesive transfer tape being characterized in that the adhesion inhibiting layer prevents an adhesive layer formed on one adherend from being in contact with another adherend to weaken the adhesion between the adherends, enabling the adherends to be easily separated from each other, and, with the passage of time after being put on one another, the adhesion inhibiting layer migrates into another adherend, so that the adherend is in contact with the adhesive layer, exhibiting strong adhesion properties between the adherends.

B. The pressure-sensitive adhesive transfer tape in accordance with paragraph A, wherein the adhesion inhibiting layer is formed from one type or two or more types of resins selected from a terpene resin, a rosin derivative, a petroleum resin, a coumarone-indene resin, a hydrogenated aromatic copolymer, a styrene resin, a phenolic resin, an acrylic resin, a xylene resin, and a hydrogenation product thereof.

C. The pressure-sensitive adhesive transfer tape in accordance with paragraphs A or B, wherein the adhesion inhibiting layer is formed from a resin having a softening point of 100° C. or lower.

D. The pressure-sensitive adhesive transfer tape in accordance with any of the previous paragraphs, wherein the adhesion inhibiting layer has a thickness of 0.05 to 5 and the adhesive layer has a thickness of 5 to 50 μm.

E. The pressure-sensitive adhesive transfer tape in accordance with any of the previous paragraphs, wherein the adhesive layer is formed from an acrylic adhesive.

F. The pressure-sensitive adhesive transfer tape in accordance with paragraph E, wherein the acrylic adhesive is an acrylic adhesive containing, relative to 100 parts by weight of an acrylic copolymer, 0.1 to 10 parts by weight of a crosslinking agent.

G. The pressure-sensitive adhesive transfer tape in accordance with any of the previous paragraphs, wherein the adhesion inhibiting layer is formed on one surface of the release substrate, and then the adhesive layer is formed on the adhesion inhibiting layer.

H. The pressure-sensitive adhesive transfer tape in accordance with any of paragraphs A-F, wherein the adhesion inhibiting layer and the adhesive layer are formed by phase separation on one surface of the release substrate.

I. The pressure-sensitive adhesive transfer tape in accordance with paragraph H, which is formed by applying a mixture obtained by mixing a compound forming the adhesion inhibiting layer with the adhesive in a ratio of 10 to 50 parts by weight of the compound, relative to 100 parts by weight (in terms of a solids content) of the adhesive.

J. A transferring implement having the pressure-sensitive adhesive transfer tape in accordance with any of the previous paragraphs.

The invention claimed is:

1. A pressure-sensitive adhesive transfer tape comprising:
on one surface of a release substrate made of paper or a plastic film, a pressure-sensitive transfer layer having an adhesion inhibiting layer and an adhesive layer, wherein the adhesion inhibiting layer and the adhesive layer are successively stacked on one another, and wherein the adhesion inhibiting layer is formed between the release substrate and the adhesive layer;
further wherein the adhesive layer is configured to bond with a first paper adherend, and, upon removal of the release substrate and contact with a second paper adherend, the adhesion inhibiting layer is configured to initially inhibit the adhesive layer from contacting the second paper adherend, and the adhesion inhibiting layer is further configured to migrate into the second paper adherend over time, causing the adhesive layer and the second paper adherend to come into contact.

2. The pressure-sensitive adhesive transfer tape according to claim 1, wherein the adhesion inhibiting layer is formed from one or more resins selected from, or hydrogenation products of resins selected from, the set consisting of a terpene resin, a rosin derivative, a petroleum resin, a coumarone-indene resin, an aromatic copolymer, a styrene resin, a phenolic resin, an acrylic resin, and a xylene resin.

3. The pressure-sensitive adhesive transfer tape according to claim 2, wherein the adhesion inhibiting layer has a thickness of 0.05 µm to 5 µm, and the adhesive layer has a thickness of 5 µm to 50 µm.

4. The pressure-sensitive adhesive transfer tape according to claim 3, wherein the adhesive layer is formed from an acrylic adhesive.

5. The pressure-sensitive adhesive transfer tape according to claim 4, wherein the acrylic adhesive is an acrylic adhesive containing, relative to 100 parts by weight of an acrylic copolymer, 0.1 parts to 10 parts by weight of a crosslinking agent.

6. The pressure-sensitive adhesive transfer tape according to claim 5, wherein the adhesion inhibiting layer and the adhesive layer are formed by phase separation on one surface of the release substrate.

7. The pressure-sensitive adhesive transfer tape according to claim 6, which is formed by applying a mixture obtained by mixing a compound forming the adhesion inhibiting layer with the acrylic adhesive in a ratio of 10 parts to 50 parts by weight of the compound, relative to 100 parts by weight, in terms of a solids content, of the acrylic adhesive.

8. The pressure-sensitive adhesive transfer tape according to claim 1, wherein the adhesion inhibiting layer is formed from a resin having a softening point of 100° C. or lower.

9. The pressure-sensitive adhesive transfer tape according to claim 1, wherein the adhesion inhibiting layer has a thickness of 0.05 µm to 5 µm, and the adhesive layer has a thickness of 5 µm to 50 µm.

10. The pressure-sensitive adhesive transfer tape according to claim 1, wherein the adhesive layer is formed from an acrylic adhesive.

11. The pressure-sensitive adhesive transfer tape according to claim 10, wherein the acrylic adhesive is an acrylic adhesive containing, relative to 100 parts by weight of an acrylic copolymer, 0.1 parts to 10 parts by weight of a crosslinking agent.

12. The pressure-sensitive adhesive transfer tape according to claim 1, wherein the adhesion inhibiting layer is formed on one surface of the release substrate, and then the adhesive layer is formed on the adhesion inhibiting layer.

13. The pressure-sensitive adhesive transfer tape according to claim 1, wherein the adhesion inhibiting layer and the adhesive layer are formed by phase separation on one surface of the release substrate.

14. The pressure-sensitive adhesive transfer tape according to claim 13, which is formed by applying a mixture obtained by mixing a compound forming the adhesion inhibiting layer with an adhesive in a ratio of 10 parts to 50 parts by weight of the compound, relative to 100 parts by weight, in terms of a solids content, of the adhesive.

15. The pressure-sensitive adhesive transfer tape according to claim 1, wherein the adhesion inhibiting layer is formed from one resin selected from, or a hydrogenation product of one resin selected from, the group consisting of a terpene resin, a rosin derivative, a petroleum resin, a coumarone-indene resin, an aromatic copolymer, a styrene resin, a phenolic resin, an acrylic resin, and a xylene resin.

16. The pressure-sensitive adhesive transfer tape according to claim 1, wherein the adhesion inhibiting layer is formed from a plurality of resins selected from, or a plurality of hydrogenation products of resins selected from, the group consisting of a terpene resin, a rosin derivative, a petroleum resin, a coumarone-indene resin, an aromatic copolymer, a styrene resin, a phenolic resin, an acrylic resin, and a xylene resin.

17. A transferring implement having the pressure-sensitive adhesive transfer tape according to claim 1, wherein the adhesion inhibiting layer is formed on one surface of the release substrate, and the adhesive layer is formed on the adhesion inhibiting layer.

* * * * *